United States Patent [19]
Garinger et al.

[11] Patent Number: 6,145,047
[45] Date of Patent: Nov. 7, 2000

[54] CIRCUIT AND METHOD FOR CONVERTING INTERRUPT SIGNALS FROM LEVEL TRIGGER MODE TO EDGE TRIGGER MODE

[75] Inventors: Ned D. Garinger, Tempe; Tein-Yow Yu, Chandler, both of Ariz.

[73] Assignee: VLSI Technology Inc., San Jose, Calif.

[21] Appl. No.: 08/245,950

[22] Filed: May 19, 1994

[51] Int. Cl.[7] .................................................. G06F 9/46
[52] U.S. Cl. .................................. 710/261; 710/260
[58] Field of Search .......................... 395/725, 325, 395/739; 710/260–269

[56] References Cited

U.S. PATENT DOCUMENTS

| | | | |
|---|---|---|---|
| 4,890,219 | 12/1989 | Heath et al. | 395/DIG. 1 |
| 5,101,497 | 3/1992 | Culley et al. | 395/725 |
| 5,261,107 | 11/1993 | Klim et al. | 395/725 |
| 5,313,640 | 5/1994 | Beardsley et al. | 395/725 |
| 5,410,708 | 4/1995 | Miyamori | 395/725 |

*Primary Examiner*—Ayaz R. Sheikh
*Assistant Examiner*—David A. Wiley

[57] ABSTRACT

Level trigger mode interrupts are converted to edge trigger mode interrupts in a computer system. A circuit detects the occurrence of a level trigger mode interrupt request, and asserts an edge trigger mode interrupt request output. The edge trigger mode interrupt request remains asserted until an End of Interrupt input is asserted, indicating that the CPU has completed servicing the prior interrupt. The edge trigger mode interrupt request is then deasserted.

7 Claims, 3 Drawing Sheets

CIRCUIT AND METHOD FOR CONVERTING INTERRUPT SIGNALS FROM LEVEL TRIGGER MODE TO EDGE TRIGGER MODE

BACKGROUND OF THE INVENTION

1. Field of the Invention

This invention generally relates to interrupt signals in a computer system, and more specifically relates to a circuit and method for converting interrupt signals from level trigger mode to edge trigger mode.

2. Description of the Related Art

In computer systems of the prior art, interrupt request lines from peripherals to the CPU were level sensitive. The interrupt converter generally detected the end of the interrupt acknowledge cycle as the end of the interrupt cycle. After waiting the minimum inactive time needed by the interrupt request input, the CPU would be ready to detect another active interrupt request signal. However, some peripherals require interrupt service that extends beyond the occurrence of the interrupt acknowledge signal, and would still be asserting the original interrupt request signal when the CPU became ready to detect another interrupt request signal. For this reason, the CPU would generate another interrupt cycle to service the interrupt, even though the interrupt was already being serviced. The CPU thus wasted the execution time of an extraneous interrupt cycle. This problem was caused by using the end of the interrupt acknowledge cycle as the end of the interrupt cycle, since the original level trigger mode interrupt request signal could still be active at this time and could be interpreted by the CPU as a second interrupt.

Therefore, there existed a need to provide a circuit and method for converting the interrupt request signals in a computer system from level trigger mode to edge trigger mode without an extraneous interrupt cycle. The circuit would thus detect an interrupt only after an End of Interrupt command is active, rather than looking only at the end of the interrupt acknowledge cycle. In this manner, the extraneous interrupt cycle inherent in the designs of the prior art is avoided.

SUMMARY OF THE INVENTION

According to the present invention, a circuit and method is provided for converting interrupt requests from level trigger mode to edge trigger mode. The circuit is a state machine which has an Interrupt Request (Level Mode) input, an END OF INTERRUPT ACKNOWLEDGE CYCLE input, an END OF INTERRUPT input, and an Interrupt Request (Edge Mode) output. State 1 of the state machine is an idle state, when the interrupt Request (Level Mode) input is deasserted, when the END OF INTERRUPT ACKNOWLEDGE CYCLE input is deasserted, and when the END OF INTERRUPT input is deasserted. The state machine changes from State 1 to State 2 when the Interrupt Request Input is asserted, and the Interrupt Request Output is asserted during State 2. The state machine changes from State 2 to State 3 when the END OF INTERRUPT ACKNOWlEDGE CYCLE input is asserted while the Interrupt Request (Level Mode) input is asserted. The state machine changes from. State 3 to State 4 when the END OF INTERRUPT input is asserted. This END OF INTERRUPT, input is asserted when the CPU issues an End of Interrupt command at the very end of each interrupt service routine. The state machine then changes from State 4 to State 1 after a predetermined time delay. The state machine can also change from State 2 to state 4 if the Interrupt Request (Level Mode) input is deasserted before the END OF INTERRUPT ACKNOWLEGE CYCLE input is asserted. This transition from State 2 to State 4 will only occur when the Interrupt Request (Level Mode) input is glitched, which generates a spurious interrupt.

A second embodiment in accordance with the present invention adds additional states between State 4 and State 1 to provide appropriate delays. A third embodiment in accordance with the present invention merges State 1 and State 4 of the preferred embodiment into a single state, thereby providing a solution in accordance with the present invention that has a minimum number of states.

The foregoing and other features and advantages will be apparent from the following description of the preferred exemplary embodiment of the invention as illustrated In the accompanying drawings.

BRIEF DESCRIPTION OF THE DRAWINGS

The preferred exemplary embodiment of the present invention will hereinafter be described in conjunction with the appended drawings, where like designations denote like elements, and.

DETAILED DESCRIPTION OF A PREFERRED EXEMPLARY EMBODIMENT

Figure 1:
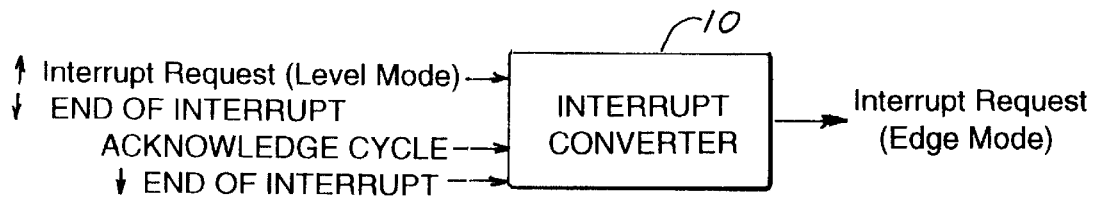
FIG. 1 is a block diagram of the interrupt converter circuit of the present invention.

Referring to the figures, the circuit of the present invention comprises an interrupt converter 10 which has an Interrupt Request (Level Mode) input, an END OF INTERRUPT ACKNOWlEDGE CYCLE input, an END OF INTERRUPT input, and an Interrupt Request (Edge Mode) output. The operation of the Circuit of FIG. 1 can be best understood with reference to FIGS. 2–4.

Figure 2:
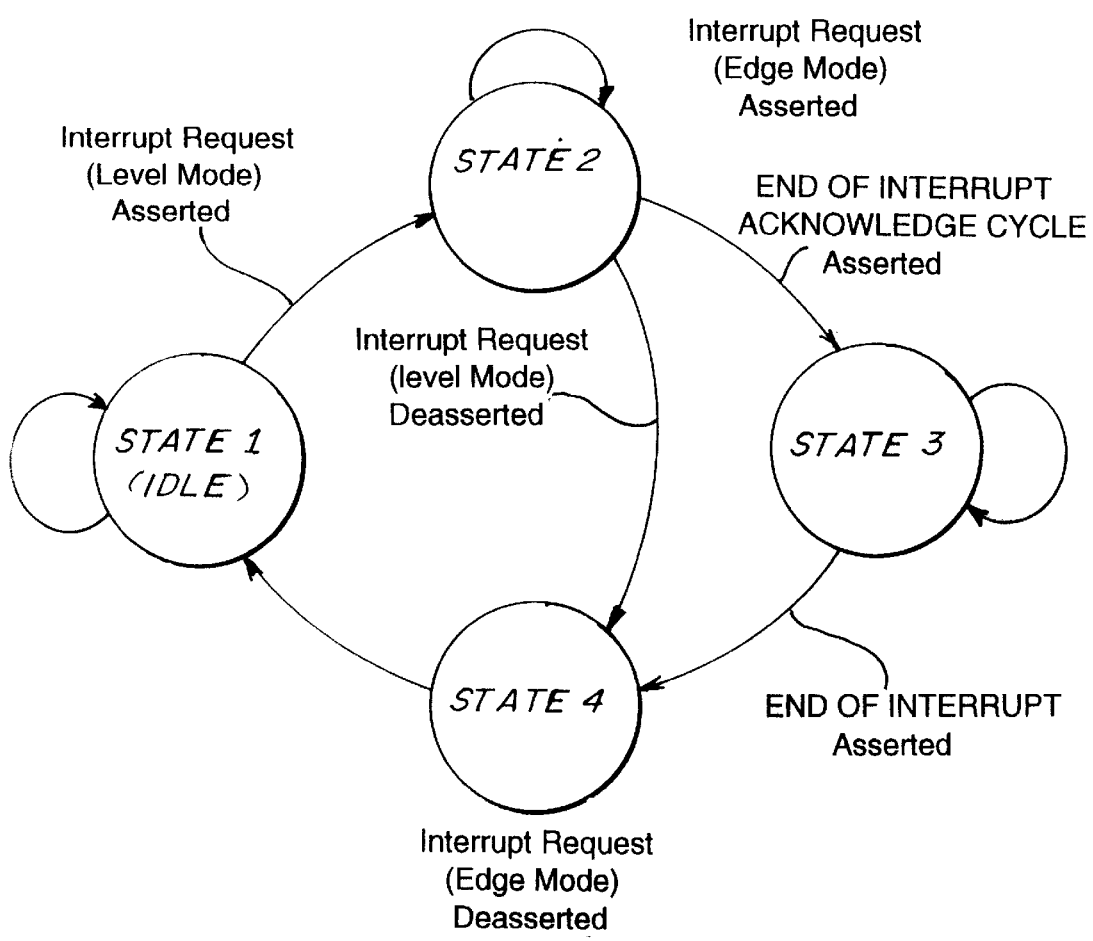
FIG. 2 is a state diagram of the preferred embodiment of tho circuit of FIG. 1.

FIG. 2 shows the state diagram of the preferred embodiment of the present invention. State 1 is the idle state, the state that the interrupt converter 10 is in when no interrupt has occurred. In State 1 the Interrupt Request (Edge Mode) output is deasserted. When the Interrupt Request (Level Mode) input is asserted, interrupt converter 10 changes to State 2. The Interrupt Request (Edge Mode) output is asserted in State 2. When in State 2, the assertion of the END OF INTERRUPT ACKNOWLEDGE CYCLE input causes interrupt converter 10 to change to State 3. This END OF INTERRUPT ACKNOWLEDGE CYCLE input is driven by external circuitry that detects the end of the CPU's interrupt acknowledge cycle. Once in State 3, interrupt converter 10 awaits the assertion of the END OF INTERRUPT input, which causes interrupt converter 10 to change to State 4 as shown. This END OF INTERRUPT input is asserted by circuitry that recognizes a defined End of Interrupt command from the CPU, which is nominally executed as the last instruction in the Interrupt Service Routine which is servicing the pending interrupt. This allows interrupt converter 10 to wait until the pending interrupt has been fully serviced before being placed in a condition to recognize another interrupt. After a predetermined time delay in State 4, interrupt converter 10 changes to State 1, and awaits another interrupt.

Note that interrupt converter 10 can change from State 2 directly to State 4 if the Interrupt Request (Level Mode) input is deasserted before the END OF INTERRUPT ACKNOWLEDGE CYCLE input is asserted. This only occurs in the case of a spurious interrupt in the system, and is provided to allow interrupt converter 10 to return to State 1 (the idle state) should a spurious interrupt occur.

Figure 3:
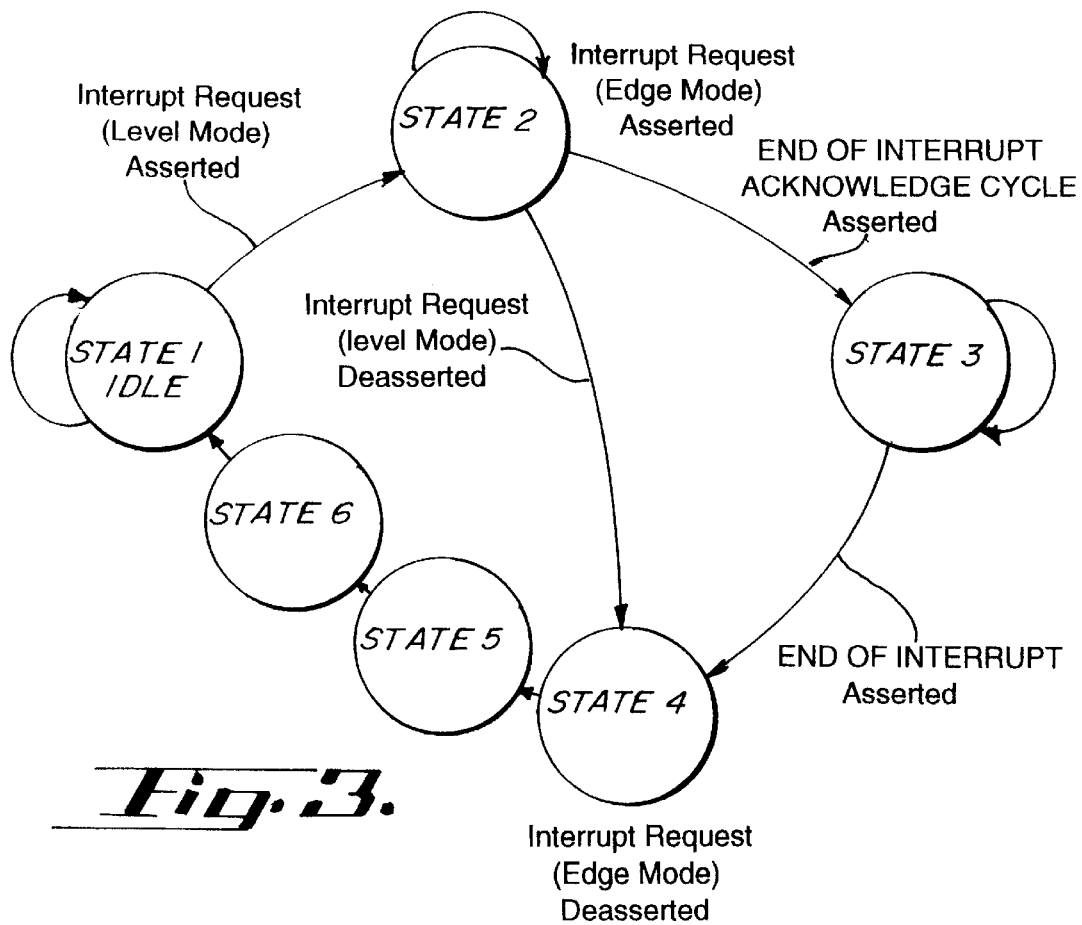
FIG. 3 is a state diagram of a second embodiment of the circuit of FIG. 1.

The second embodiment of interrupt converter 10 in accordance with the present invention is shown by the state diagram of FIG. 3. In this implementation, State 5 and State 6 are added to provide additional time delay between State 4 and State 1.

Figure 4:
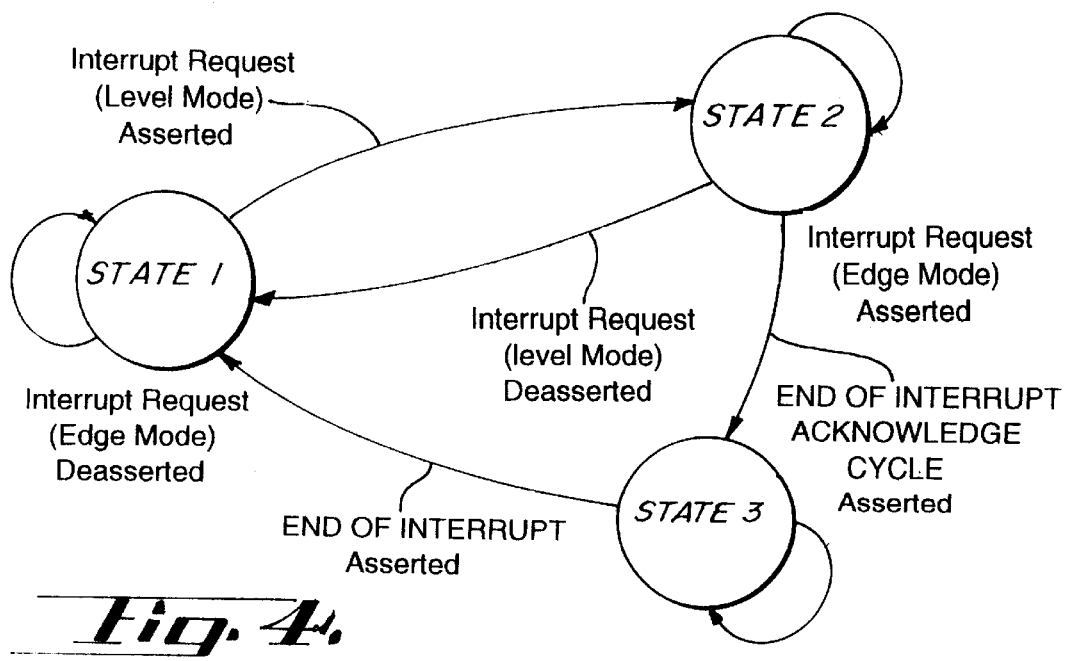
FIG. 4 is a state diagram of a third embodiment of the circuit of FIG. 1.
Figure 5:
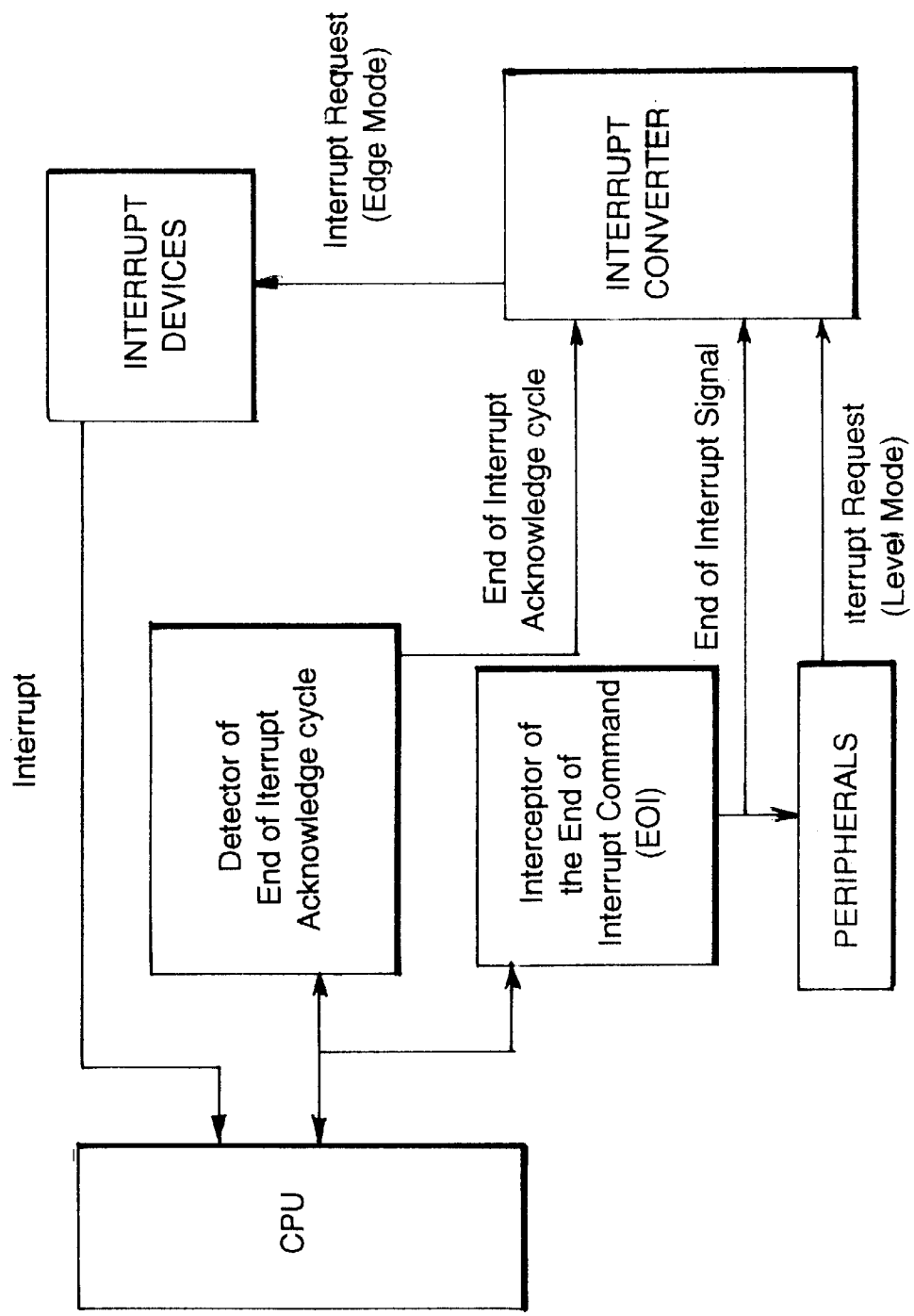
FIG. 5 is a block diagram schematic of an exemplary implementation of the interrupt converter of FIG. 1 within a computer system.

The third embodiment of interrupt converter 10 in accordance with the present invention is shown by the state diagram of FIG. 4. In this third embodiment, State 1 and State 4 of FIG. 2 are combined into a new State 1, thereby minimizing the number of states needed to implement interrupt converter 10 in accordance with the present invention.

FIG. 4 shows a typical implementation of the interrupt converter 10 of the present invention within a computer system.

While the invention has been described in its preferred exemplary embodiment, it is to be understood that the words which have been used are words of description rather than limitation, and that changes may be made within the purview of the appended claims without departing from the true scope and spirit of the invention in its broader aspects. For example, it will be understood that, while various of the conductors (connections) are shown in the drawing as single lines, they are not so shown in a limiting sense, and may comprise plural conductor (connections), as is understood in the art.

What is claimed is:

1. A circuit for converting interrupt signals from level trigger mode to edge trigger mode in a computer system comprising, in combination:
   an interrupt converter comprising:
      an interrupt request level trigger mode input means for receiving an interrupt request level trigger mode input signal asserted by a peripheral device within the computer system when the peripheral device requires service from a CPU within the computer system;
      an END OF INTERRUPT input means for receiving an END OF INTERRUPT input signal asserted by circuitry, the circuitry detects when the CPU has completed servicing an interrupt; and
      an interrupt request edge trigger mode output means for outputting an interrupt request edge trigger mode signal to the CPU which is asserted by the interrupt converter when the interrupt request level trigger mode input signal is asserted, and which is deasserted when the END OF INTERRUPT input signal is asserted.

2. A circuit for converting interrupt signals from level trigger mode to edge trigger mode in a computer system comprising, in combination:
   an interrupt converter comprising:
      an interrupt request level trigger mode input means for receiving an interrupt request level trigger mode input signal asserted by a peripheral device within the computer system when the peripheral device requires service from a CPU within the computer system;
      an END OF INTERRUPT ACKNOWLEDGE CYCLE input means for receiving an END OF INTERRUPT ACKNOWLEDGE CYCLE input signal asserted by circuitry, the circuitry detects the end of an interrupt acknowledge cycle asserted by the CPU;
      an END OF INTERRUPT input means for receiving an END OF INTERRUPT input signal asserted by circuitry, the circuitry detects when the CPU has completed servicing an interrupt;
      an interrupt request edge trigger mode output means for outputting an interrupt request edge trigger mode output signal to the CPU which is asserted by the interrupt converter when the interrupt request level trigger mode input signal is asserted and the END OF INTERRUPT ACKNOWLEDGE CYCLE input signal is deasserted and the END OF INTERRUPT input signal is deasserted, and which is deasserted when the END OF INTERRUPT input signal is asserted.

3. A method for converting interrupt signals from level trigger mode to edge trigger mode including the steps of:
   providing an interrupt converter comprising the steps of:
      providing an interrupt request level trigger mode input means for receiving an interrupt request level trigger mode input signal asserted by a peripheral device within the computer system when the peripheral device requires service from a CPU within the computer system;
      providing an END OF INTERRUPT ACKNOWLEDGE CYCLE input means for receiving an END OF INTERRUPT ACKNOWLEDGE CYCLE input signal asserted by circuitry, the circuitry detects the end of an interrupt acknowledge cycle by the CPU;
      providing an END OF INTERRUPT input means for receiving an END OF INTERRUPT input signal asserted by circuitry, the circuitry detects when the CPU has completed servicing an interrupt;
      providing an interrupt request edge trigger mode output means for outputting an interrupt request edge trigger mode output signal to the CPU which is asserted by the interrupt converter when the interrupt request level trigger mode input signal is asserted, and which is deasserted when the END OF INTERRUPT input signal is asserted;
   remaining in a first state when the interrupt request level trigger mode input signal is deasserted;
   changing from the first state to a second state when the interrupt request level trigger mode input signal is asserted in the first state;
   asserting the interrupt request edge trigger mode output signal during the second state;
   changing from the second state to a third state when the END OF INTERRUPT ACKNOWLEDGE CYCLE input signal is asserted in the second state, the interrupt request edge trigger mode output signal continuing to be asserted during the third state;
   changing from the third state to a fourth state when the END OF INTERRUPT input signal is asserted in the third state;
   deasserting the interrupt request edge trigger mode output signal during the fourth state; and
   changing from the fourth state to the first state after a predetermined time delay has elapsed in the fourth state.

4. The method of claim 3 further including the step of changing from the second state to the fourth state when the interrupt request level trigger mode input signal is deasserted before the END OFF INTERRUPT ACKNOWLEDGE CYCLE input signal is asserted.

5. The method of claim 3 wherein the predetermined time delay being created by passing through at least one additional state between the fourth state and the first state.

6. A method for converting interrupt signals from level trigger mode to edge trigger mode including the steps of:

providing an interrupt converter comprising the steps of:

providing an interrupt request level trigger mode input means for receiving an interrupt request level trigger mode input signal asserted by a peripheral device within the computer system when the peripheral device requires service from a CPU within the computer system;

providing an END OF INTERRUPT ACKNOWLEDGE CYCLE input means for receiving an END OF INTERRUPT ACKNOWLEDGE CYCLE input signal asserted by circuitry, the circuitry detects the end of an interrupt acknowledge cycle by the CPU;

providing an END OF INTERRUPT input means for receiving an END OF INTERRUPT input signal asserted by circuitry, the circuitry detects when the CPU has completed servicing an interrupt;

providing an interrupt request edge trigger mode output means for outputting an interrupt request edge trigger mode output signal to the CPU which is asserted by the interrupt converter when the interrupt request level trigger mode input signal is asserted, and which is deasserted when the END OF INTERRUPT input signal is asserted;

remaining in a first state when the interrupt request level trigger mode input signal is deasserted;

changing from the first state to a second state when the interrupt request level trigger mode input signal is asserted in the first state;

asserting the interrupt request edge trigger mode output signal during the second state;

changing from the second state to a third state when the END OF INTERRUPT ACKNOWLEDGE CYCLE input signal is asserted in the second state, the interrupt request edge trigger mode output signal continuing to be asserted during the third state;

changing from the third state to the first state when the END OF INTERRUPT input signal is asserted in the third state; and deasserting the interrupt request edge trigger mode output signal during the first state.

7. The method of claim 6 further including the step of changing from the second state to the first state when the interrupt request level trigger mode input signal is deasserted before the END OFF INTERRUPT ACKNOWLEDGE CYCLE input signal is asserted.

* * * * *

UNITED STATES PATENT AND TRADEMARK OFFICE
CERTIFICATE OF CORRECTION

PATENT NO. : 6,145,047
DATED : November 7, 2000
INVENTOR(S) : Garinger et al.

It is certified that error appears in the above-identified patent and that said Letters Patent is hereby corrected as shown below:

Column 5,
Line 4, "OFF" should read -- OF --.

Column 6,
Lie 26, "OFF" should read -- OF --.

Signed and Sealed this

Sixth Day of November, 2001

Attest:

NICHOLAS P. GODICI
*Attesting Officer*  *Acting Director of the United States Patent and Trademark Office*